United States Patent [19]

Deming et al.

[11] Patent Number: 5,127,542
[45] Date of Patent: Jul. 7, 1992

[54] PROCESS AND APPARATUS FOR PROPORTIONING LIQUIDS

[75] Inventors: Laura L. Deming, Lunenburg; Gaston de los Reyes, Framingham, both of Mass.

[73] Assignee: Millipore Corporation, Bedford, Mass.

[21] Appl. No.: 561,427

[22] Filed: Aug. 1, 1990

[51] Int. Cl.⁵ .............................................. B67D 5/08
[52] U.S. Cl. .................................. 222/1; 137/101.25; 222/64; 222/145
[58] Field of Search ............... 222/1, 64, 145; 137/98, 137/101.25

[56] References Cited

U.S. PATENT DOCUMENTS

| | | | |
|---|---|---|---|
| 3,237,808 | 3/1966 | Witt et al. | 222/64 |
| 3,705,598 | 12/1972 | Ray | 137/101.25 |
| 3,877,682 | 4/1975 | Moss | 222/145 X |
| 4,515,178 | 5/1985 | Campau | 222/64 X |
| 4,580,699 | 4/1986 | Black et al. | 222/64 |
| 4,597,507 | 7/1986 | Rosenblum et al. | 222/16 |

FOREIGN PATENT DOCUMENTS 255607 12/1964 Australia .............................. 222/64

Primary Examiner—Donald T. Hajec
Attorney, Agent, or Firm—Andrew T. Karnakis; Paul J. Cook

[57] ABSTRACT

A proportioning process and apparatus is provided for forming a liquid composition by admixture of a plurality of liquid components. The apparatus includes a main chamber, a subchamber positioned within the main chamber and conduits for introducing the liquid components sequentially into the subchamber which then overflow into the main chamber. The main chamber and subchamber are provided with outlets so that the liquid therein can be admixed to form the liquid composition. A pressure sensor in the subchamber is provided to measure the head pressure of each component in the subchamber and the main chamber which, because the dimensions of the subchamber and main chamber are known, can be used to measure the volumes of the liquid components to be admixed. A level sensor is provided at the top of the main chamber to be used as a calibration point and for overflow detection.

15 Claims, 2 Drawing Sheets

PROCESS AND APPARATUS FOR PROPORTIONING LIQUIDS

BACKGROUND OF THE INVENTION

This invention relates to a process and apparatus for proportioning a plurality of liquid components to form a multicomponent liquid mixture.

When administering medical grade solutions to a patient or when packaging medical grade solutions, it is necessary to proportion accurately the individual components used to form the final solution composition. In addition, it is necessary to control the volume of the solution being administered or packaged for subsequent administration to a patient. Thus, it is necessary to control the volume of each constituent forming the final solution over the entire time period of administration or packaging. It is common practice to measure the volume of a liquid in a container by measuring the pressure at the bottom of the liquid column of known density wherein the container has a known cross section over the entire column height according to the equation:

$$P = \rho g h$$

$$\text{and } V = A h$$

wherein P is the pressure at the bottom of the liquid column in the container due to the liquid column, $\rho$ is the liquid density, g is acceleration due to gravity, h is the liquid column height A is the container cross sectional area, which may be a function representing cross sectional area as a function of height, and V is the liquid volume in the container.

Unfortunately, presently available pressure sensing devices such as pressure sensing transducers, are prone to drift over time so that the indicated pressure indicated by the device is outside the allowable range of error and the measurements become unreliable.

It has been proposed in U.S. Pat. No. 4,597,507 to provide apparatus for metering a premixed solution to a container having a pressure sensing device which provides an output signal proportional to the solution volume in the container. Once the desired volume has been determined, it is then removed from the container and directed to the point of use. The pressure output signal is used to activate or inactivate a liquid inlet valve and a liquid outlet valve associated with conduits connected to the container. An overflow outlet is provided with the container so that it can be periodically filled completely and the pressure measured. This pressure measurement together with the known container volume is used to determine the density of the liquid within the container. This density measurement is effected independently of the container's normal use so that normal container use must be interrupted to obtain the measurement. No means are provided for compensating for pressure sensor drift. Accordingly, the apparatus provides no means for determining the integrity of the pressure sensor measurements over time and, due to the inevitable pressure measurement drift with the apparatus in this art, volume measurements will become inaccurate. In medical applications, inaccurate volume measurements cannot be tolerated.

Accordingly, it would be desirable to provide an apparatus which is capable of accurately proportioning individual liquid components to form a final desired liquid composition. In addition, it would be desirable to provide such an apparatus which maintains the desired measurement accuracy over long time periods.

SUMMARY OF THE INVENTION

The present invention provides a proportioning process and apparatus for forming a liquid composition from a plurality of liquid components. One or more liquid components are introduced into a subchamber of known dimensions (height and cross-sectional area) and the static pressure of each liquid component is measured with a pressure sensor positioned at the base of the subchamber. An additional liquid component then is added to the subchamber to cause the liquid component(s) of known volume in the subchamber to overflow into a main chamber of known dimensions up to a maximum volume as controlled by the pressure sensor with a liquid level sensor present to detect overflowing from the chamber. The pressure of the liquid mixture in the main chamber is measured with the same pressure sensor located at the base of the subchamber when the liquid level in the main chamber is equal to the subchamber overflow level or above that overflow level. During the time that the liquid level in the main chamber has not reached the height of the overflow from the subchamber and the liquid from the subchamber is overflowing to fill the main chamber, the pressure sensor measures the pressure of the liquid in the full subchamber. The known subchamber height can be used to check the pressure sensor reading which then can be used to calculate the stop height for the diluting liquid in the main chamber to obtain the desired dilution. If the pressure sensor reading is outside allowable drift, the process is stopped for repair. The stop height is above the overflow height and below the main chamber level detector. The level detector is used to prevent excessive dilution and as an additional calibrate point when the apparatus is not being used in the proportioning mode. The main chamber and subchamber then are emptied of the liquid components therein, which are mixed together to form the desired liquid composition. The liquid composition which is of measured volume then can be directed to a reservoir of known dimensions which is provided with a second pressure sensor to measure pressure which can be used to calculate the volume of the liquid with known composition. This serves as a validation of the measurement made by the first pressure sensor. Should the volume measurements made by these two independent devices disagree, the system is stopped for repair.

DESCRIPTION OF SPECIFIC EMBODIMENTS

Figure 1:
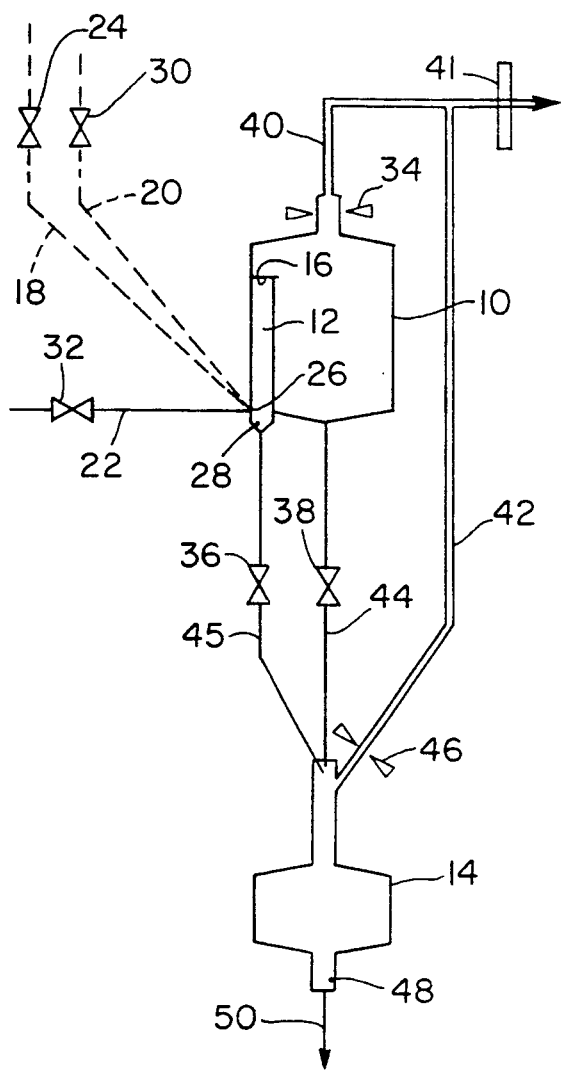
FIG. 1 illustrates the apparatus of this invention.

Referring to FIG. 1, the apparatus of this invention includes a main chamber 10, a subchamber 12 and a reservoir 14. The subchamber 12 is positioned parallel to chamber 10 so that a liquid volume in excess of the volume of subchamber 12 overflows through top outlet 16 into chamber 10. Provision of the reservoir 14 is preferred but it is not essential to the present invention. The reservoir serves the primary function of mixing liquid exiting from subchamber 12 and chamber 10 and serving as an accumulator. However, any conventional means for mixing liquids downstream of the chamber 10 and subchamber 12 can be utilized.

As shown in FIG. 1, three liquid components can be delivered through conduits 18, 20, and 22 for a first liquid component, a second liquid component and a third liquid component respectively. In a first step, valve 24 is opened so that the first liquid enters inlet 26 to subchamber 12 to partially fill subchamber 12. Pressure sensor 28, measures the static pressure of the first liquid component. Since the dimension of the subchamber 12 and the density of the first liquid component are known, the pressure measurement obtained gives the operator sufficient information as to whether the correct volume of the first liquid component is present in subchamber 12. After it has been determined so that the correct volume of the first liquid component is present in subchamber 12, valve 24 is closed and valve 30 is opened to permit the second liquid component to pass through conduit 20 and inlet 26 into subchamber 12. The sum of the volumes of the second liquid component and the first liquid component is less then the subchamber volume so that a pressure measurement can be observed with pressure sensor 28 to determine whether the correct amount of the second liquid component is present in subchamber 12 in the manner set forth above. Valve 30 then is closed and valve 32 is opened to permit the third liquid component to pass through conduit 22 and inlet 26 to enter subchamber 12, overflow through outlet 16 into chamber 10, up to a stop level below the level sensed by level sensor 34. Since the densities of the first, second and third liquid components are known, as is the height of the subchamber 12 to the overflow point, a pressure measurement obtained with pressure sensor 28 can be utilized to determine whether drift has occurred in pressure sensor 28 and whether the measurements are accurate. It is to be noted that both chambers 12 and reservoir 14 are vented to the atmosphere by means of conduits 40 and 42, each of which can contain an air filter 41 to prevent microbiological contamination of the system. Valves 36 and 38 then are opened so that liquid in chamber 10 and subchamber 12 can pass through conduits 44 and 45 into reservoir 14. The reservoir 14 is provided with a level sensor 46 to detect an overfill of the volume of liquid in the reservoir. The pressure sensor 48 is utilized to measure the volume of liquid composition of known density in the reservoir 14 of known dimensions. The liquid from reservoir 14 then is delivered for use through conduit 50. In the case of forming a liquid composition for use in dialysis, the first and second liquid components can be aqueous dextrose concentrate and aqueous electrolyte concentrate while the third liquid component is purified water with provisions for in situ fluid sterilization downstream of proportioning, e.g. filtration sterilization.

In one aspect of this invention, the pressure sensors 28 and 48 are positioned normal to and below the input of flow of liquid into the subchamber 12 and reservoir 14. By positioning the pressure sensors 28 and 48 normal to liquid flow, dynamic pressure sensing caused by liquid flow is minimized or eliminated.

Figure 3:
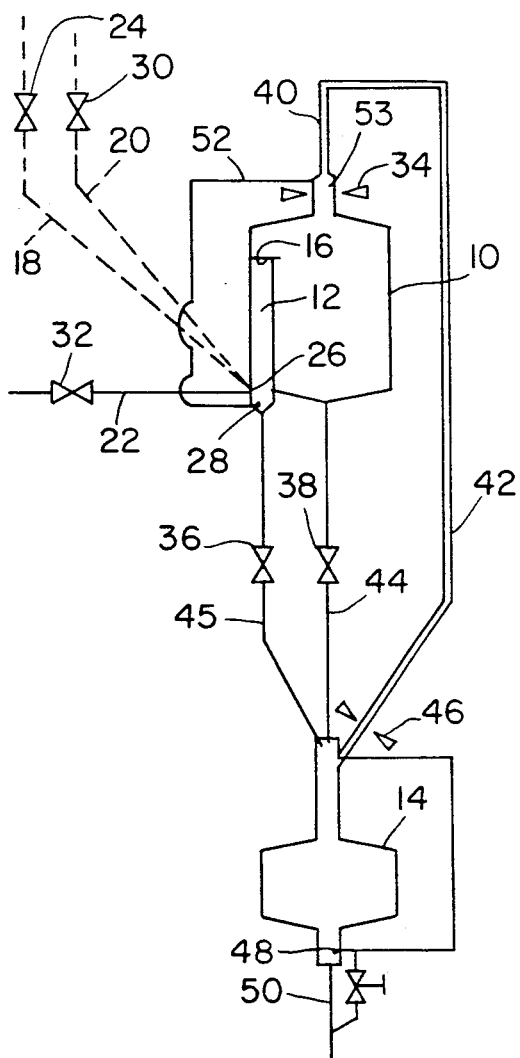
FIG. 3 illustrates the use of a differential pressure sensor in the apparatus of FIG. 1.
Figure 4:
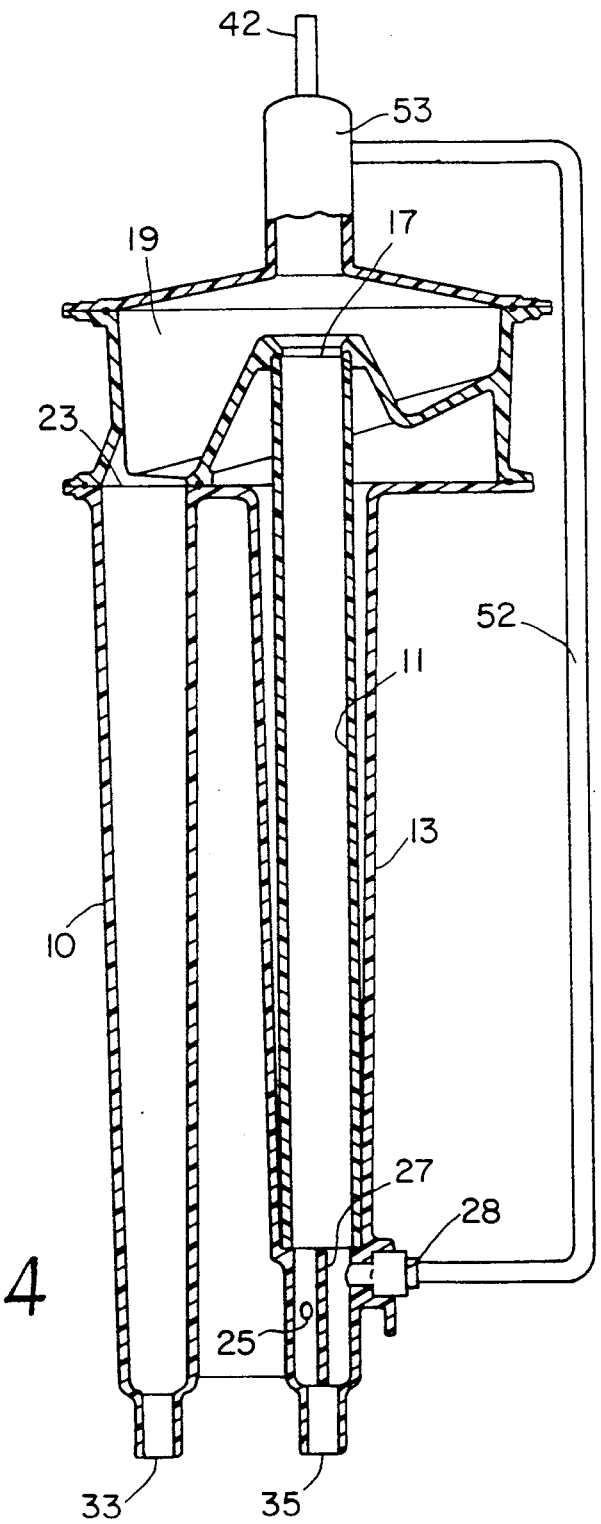
FIG. 4 illustrates the use of a differential pressure sensor in the apparatus of FIG. 2.

As an alternative, a differential pressure sensor could be utilized in a closed system to measure pressure at both the top and bottom of the chamber 10 as shown in FIGS. 3 and 4. That is, unlike the apparatus shown in FIG. 1 wherein the main chamber 10 is in communication with the atmosphere, a conduit 52 can be provided to communicate the top of the chamber with a differential pressure sensor 28. The differential pressure sensor 28 is positioned at the bottom of subchamber 11. The differential pressure sensor is a conventional device wherein, on side of a pressure sensor is fluidically connected to the bottom portion of subchamber 11 and simultaneously measures the pressure at the top portion 53 of the chamber 10 above the liquid level in the chamber or subchamber and the pressure at the bottom portion of the subchamber 11. The differential pressure sensor provides an accurate pressure measurement of the difference between the pressure exerted on the top of the fluid column (i.e. due to compressed air) and the pressure of compressed air plus the fluid column.

Figure 2:
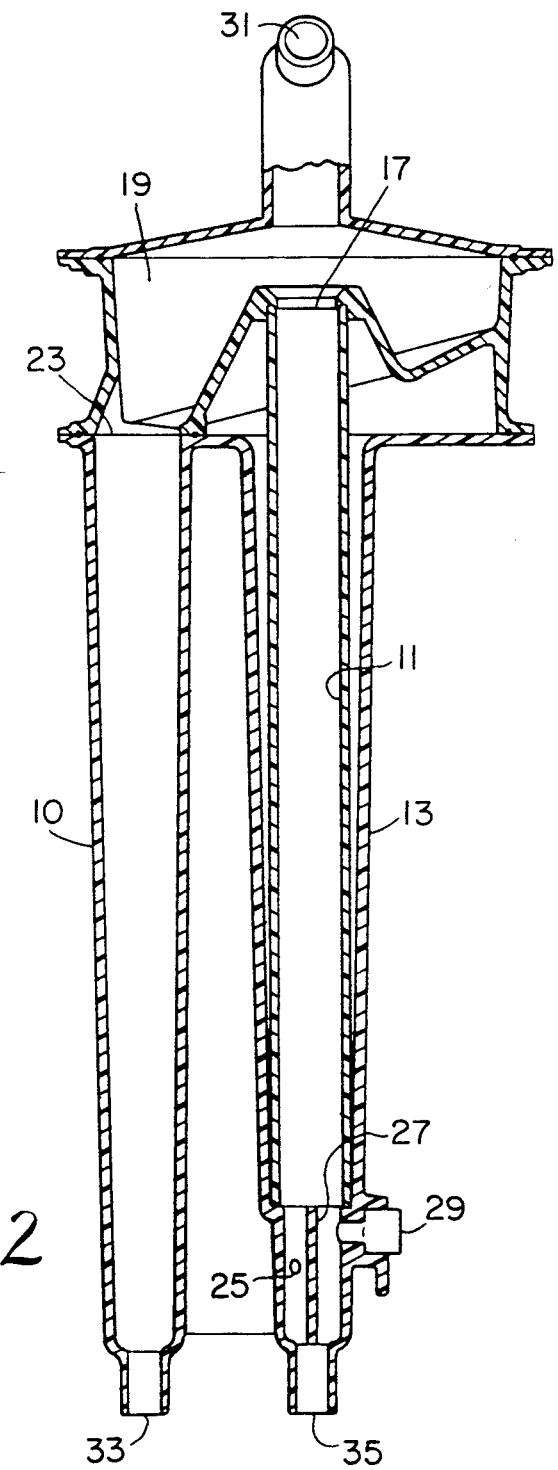
FIG. 2 is a cross-sectional view of a chamber-subchamber arrangement of this invention.

Referring to FIG. 2, the apparatus of this invention includes a subchamber 11, enclosed within housing 13 and a main chamber 10. Subchamber 11 and chamber 10 are in fluid communication by means of subchamber outlet 17, connecting chamber 19 and chamber inlet 23. The connecting chamber 23 comprise the top portion of main chamber 10. Inlet 25 is provided into subchamber 11 for liquid to be delivered thereto as described above with reference to FIG. 1. A baffle 27 minimizes exposure of the pressure sensor 29 to the dynamic pressure force of the moving stream of incoming liquid. By utilizing the baffle 27, an accurate pressure measurement of the head of the liquid within the subchamber 11 can be obtained. A level sensor 31 is provided to alert the operator of an overfill condition. Chamber outlet 33 and subchamber outlet 35 are provided for the purpose set forth above with reference to FIG. 1.

We claim:

1. Apparatus for proportioning a plurality of liquid components for admixture with each other to form a liquid composition which comprises:

a main chamber having a top portion and a bottom portion, an outlet positioned at said bottom portion of said main chamber and an inlet positioned at said top portion of said main chamber, a subchamber having a second top portion and a second bottom portion, means for introducing a plurality of liquid components sequentially into said subchamber, said second top portion of said subchamber being positioned above said main chamber outlet and being in fluid communication with said main chamber inlet, pressure sensing means adapted to sense liquid pressure at said second bottom portion of said subchamber and to sense liquid pressure in said main chamber, means for limiting the maximum volume of liquid in said main chamber, and said outlet means on said main chamber and a second outlet means on said subchamber for removing liquid from said main chamber and said subchamber.

2. The apparatus of claim 1 wherein said pressure sensing means is positioned normal to the direction of liquid flow within said subchamber.

3. The apparatus of claim 1 wherein said subchamber has a diameter substantially smaller than the diameter of said main chamber.

4. The apparatus of claim 2 wherein said subchamber has a diameter substantially smaller than the diameter of said main chamber.

5. The apparatus of claim 1 wherein said means for introducing comprises means for introducing three liquid components sequentially into said subchamber.

6. The apparatus of claim 2 wherein said means for introducing comprises means for introducing three liquid components sequentially into said subchamber.

7. The apparatus of claim 1 wherein said outlet means on said main chamber and said second outlet means on said subchamber direct liquid to a second chamber.

8. The apparatus of claim 2 wherein said outlet means on said main chamber and said second outlet means on said subchamber direct liquid to a second chamber.

9. The apparatus of claim 1 wherein said pressure sensing means comprises a differential pressure sensor that simultaneously measures pressure above a liquid level in said chamber or subchamber and pressure at the base of fluid column of said subchamber.

10. The apparatus of claim 7 wherein said second chamber includes means for measuring liquid pressure at the base of said second chamber.

11. The apparatus of claim 7 wherein said second chamber includes a level sensor adapted to determine the presence of excess liquid in said second chamber.

12. The process of proportioning a plurality of liquids for admixture with each other to form a liquid composition with the apparatus of claim 1 which comprises introducing a first liquid component into said subchamber, measuring the static pressure of said first liquid in said subchamber, introducing a second liquid component into said subchamber to overflow liquid from said subchamber into said main chamber to fill said main chamber up to a level determined by said means for limiting the maximum volume of liquid, measuring the static pressure of said first liquid and said second liquid in said main chamber and removing said liquid in said subchamber and said main chamber in admixture to form said liquid composition.

13. The process of proportioning a plurality of liquids for admixture with each other to form a liquid composition with the apparatus of claim 1 which comprises introducing a first liquid component into said subchamber, measuring the static pressure of said first liquid in said subchamber, introducing a second liquid into said subchamber measuring the static pressure of said first liquid and second liquid in said subchamber whereby the total volume of said first and second liquid components is less than the volume of said subchamber, introducing a third liquid into said subchamber, to overflow liquid from said subchamber into said main chamber up to a level determined by said means for limiting the maximum volume of liquid, measuring the static pressure of said first liquid, said second liquid and said third liquid in said main chamber and removing said liquid in said subchamber and in said main chamber in admixture to form said liquid composition.

14. The process of claim 13 wherein one of said first liquid component or said second liquid component is concentrated aqueous dextrose, one of said first liquid component or said second liquid component is concentrated aqueous electrolyte and said third liquid component is purified water.

15. The process of claim 12 wherein said first liquid component comprises a plurality of liquid compositions.

* * * * *